SYNCHRONIZING CIRCUIT

Filed June 23, 1965 2 Sheets-Sheet 1

WILLIAM F. BOYLAN
LEONARD KOWAL
INVENTORS

BY Anderson, Luedeka, Fitch, Even & Tabin
ATTORNEYS

WILLIAM F. BOYLAN
LEONARD KOWAL
INVENTORS

BY Anderson, Luedeka, Fitch, Even & Tabin
ATTORNEYS

United States Patent Office 3,355,649

Patented Nov. 28, 1967

3,355,649

SYNCHRONIZING CIRCUIT

William F. Boylan, Morton Grove, and Leonard Kowal, Chicago, Ill., assignors to Ampex Corporation, Redwood City, Calif., a corporation of California Filed June 23, 1965, Ser. No. 466,296
11 Claims. (Cl. 318—314)

Figure 1:
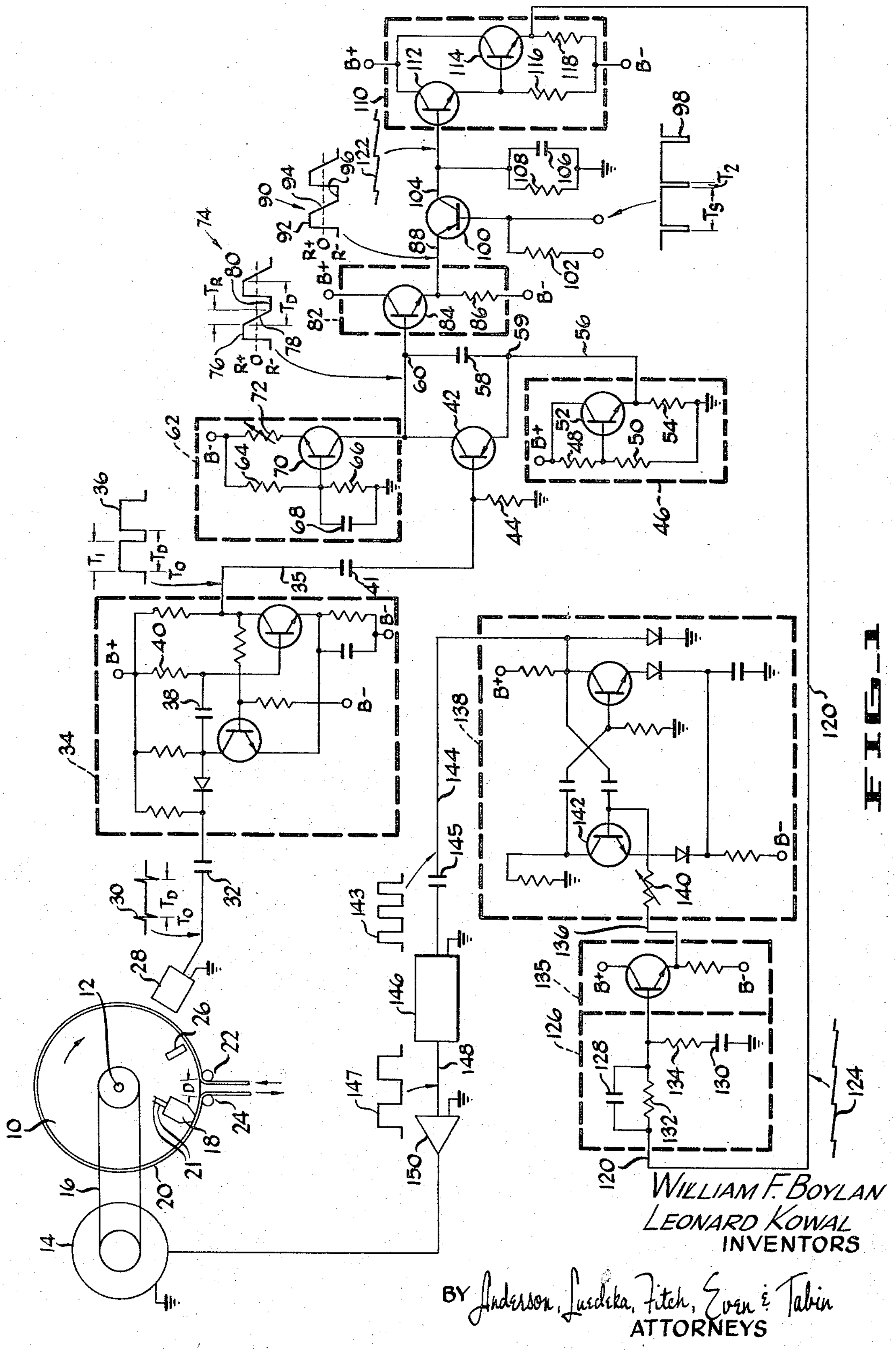

This invention relates to speed regulation of a tape recorder and more particularly to the synchronization of the transducer head assembly of a tape recorder. Still more particularly, it relates to a speed regulating circuit to phase-lock the head drum of a helical scan type of a video tape recorder with synchronizing pulses. This invention still further relates to a phase error detector for deriving an error signal to phase-lock the head drum to the synchronizing pulses.

Although speed and relative phase is important in various recorders, it is particularly important in video tape recorders of the type wherein the transducing head is periodically out of operative relationship with the record tape. This invention has particular application to the helical scan type of video tape recorder employing the so-called omega wrap. In such recorders a single recorder head is rotated on a drum to traverse the tape once for each video field. When the head leaves the tape during an interval, no signal is recorded during that interval. This absence of recorded signal is known as signal dropout. When the record is reproduced, this dropout leaves a no signal region on the ultimate picture. It is desirable that this dropout occur at the beginning or end of a video field so as not to appear in the center of the picture, where it would be conspicuous. A convenient and unobtrusive place for this dropout is near the end of a video field just prior to the vertical synchronization interval. With the recorder in its recording mode, the vertical synchronization signal may be used to synchronize the rotation of the head drum, to place the head drum in the dropout region just prior to a succeeding vertical synchronizing signal. During playback or reproduction of the recording, synchronizing pulses may be derived from a control track on the tape on which signals derived from the vertical synchronization signals were placed during recording.

It is important not only to determine the phase error and lock the head drum in phase with the synchronizing pulses, but also to capture the head drum to cause it to rotate at or near the required frequency before it can be locked in phase.

In video tape recorders of the prior art, it has been known to phase-lock the head drum to synchronizing pulses. It is known to utilize the synchronizing pulses to develop a trapezoidal signal including ramp portions extending from between some reference potential and ground and sampling this trapezoidal signal, particularly the ramp, at a particular time during each cycle of the head drum to develop a position indicating signal related to the head position relative to the desired phase-locked position in respect to the synchronizing pulses. To develop a signal directly related to the deviation of the head position from the desired position, a constant voltage was added to the position indicating signal to make the error signal zero when the head was in the desired position in respect to the synchronizing pulses. Further, synchronizing pulses were sometimes missing, as occasioned by poor signal reception or some other aberration, in which case no trapezoidal signal was developed. Not only did this leave no ramp portion to synchronize with, but it left the signal at the reference potential and provided an error signal even in absence of error. The prior art included a circuit for sensing absence of synchronizing pulses; this circuit provided control signals to prevent error correction in the absence of such pulses.

The resultant error signal was utilized to control the frequency of an oscillator used to drive the head drum. This error signal operated to change the frequency in such direction as to reduce the phase error and hence phase-lock the head position to the synchronizing pulses.

In accordance with the present invention, the head position pulses are used to produce the trapezoidal signal and the synchronizing pulses are used as the sampling pulses. The trapezoid is made to run between a positive reference level and a negative reference level so that the ramp crosses zero at the time relative to the head position where it is desired that the synchronizing pulse occur. No zero shift circuit is required. In order to provide equal stability in both directions from the phase-locked condition, the ramp is made linear and the positive and negative reference levels made equally displaced from zero. Because the sampling pulses are the synchronizing pulses rather than the head position pulses, there is no signal sampled in absence of synchronizing pulses, and the system does not attempt to correct for an error in phase when there are no synchronization pulses to be in error with respect to. That is, whenever a synchronizing pulse does not appear for one reason or another, the circuit produces a zero error signal without seeking to correct a non-existent error. The error signal is used to control motor speed to phase-lock the head position to the synchronizing pulses.

Further, in accordance with a preferred form of the present invention, a capture circuit is provided to capture the head drum and bring it near the proper frequency to permit the phase-lock circuit to lock it to a particular phase relative to the synchronizing pulses. This is achieved by fixing the duration of the ramp and the portion of the trapezoidal signal of one polarity. The portion of the other polarity therefore varies in length in accordance with the period of the head. The fixed durations are fixed at the predetermined intervals at which the integral of the area under the positive portion of the trapezoidal wave equals the integral of the area under the negative portion of the trapezoidal wave when the head is rotating at the synchronous frequency. For equal positive and negative reference levels, the positive and negative portions are made of equal length at synchronous speed. The variable portion is the portion having the polarity of the ramp when the head position pulse lags the phase-locked position. The sampled pulses are then integrated, and a signal is developed for a low speed of the same polarity as for lagging phase, and for a high speed of the same polarity as for a leading phase, in either case controlling motor speed to correct for the error, thus capturing the head drum to operate at synchronous speed and permitting phase-locking of the head position to the synchronizing pulses.

It is therefore a primary object of the present invention to provide speed regulation for synchronizing a tape recorder with synchronization pulses. It is a further object of the invention to provide speed regulation for a helical scan type of tape recorder to synchronize the head drum thereof with synchronizing pulses. Another object of the invention is to provide a speed regulating circuit where the error voltage for the system is linearly related to the phase error of the head drum in respect to synchronizing pulses. Still another object of the invention is to provide a speed regulating circuit wherein the error signal is zero when there is no phase error. A further object of the invention is to provide a speed regulating circuit wherein the error signal is zero in absence of synchronizing pulses. An additional object is to provide a capture circuit to capture the head drum in order that the head drum may be phase-locked to the synchronizing pulses.

Figure 2:
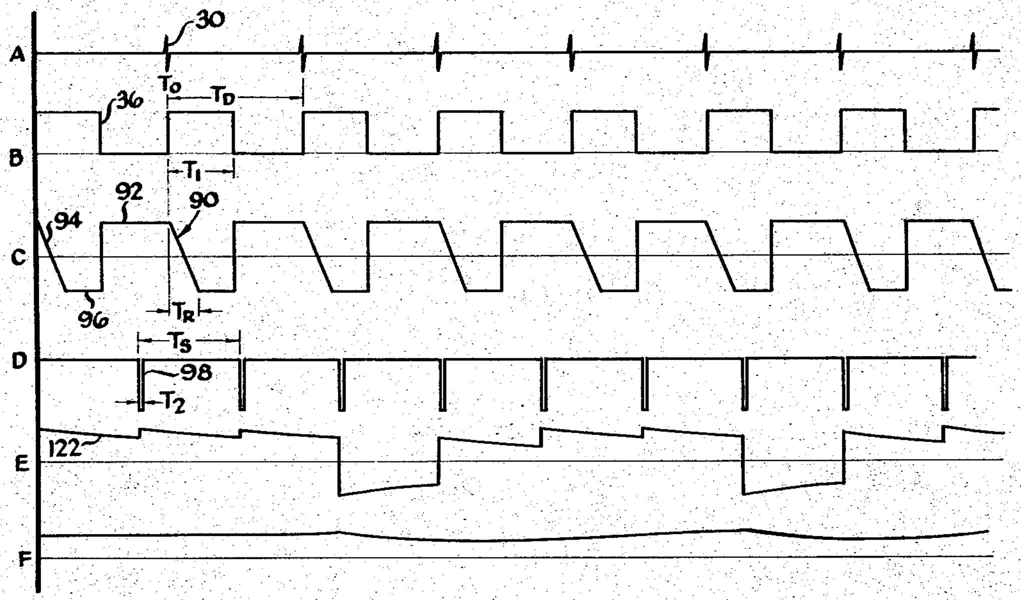
Figure 3:
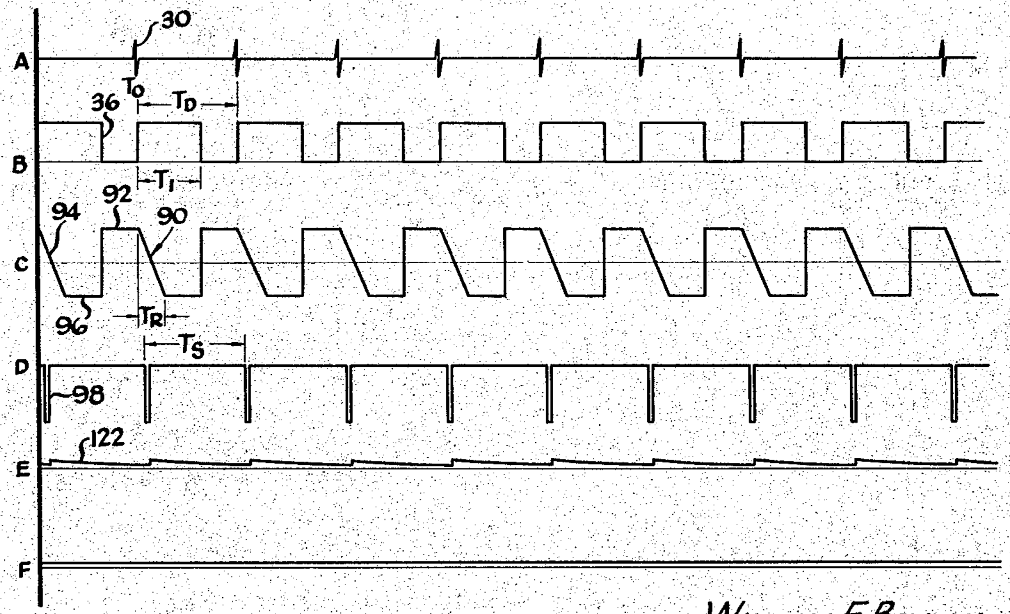

Additional objects and advantages of the present invention will become apparent from consideration of the following description of the invention, particularly when taken in connection with the drawings in which:

FIGURE 1 is a diagrammatic illustration of a preferred form of the speed regulating circuit of the present invention;

FIGURE 2 is an illustration of the wave form of potentials appearing at various points in the circuit shown in FIGURE 1 and their time relationships when the head drum rotates more slowly than synchronous speed; and FIGURE 3 is an illustration of the wave forms of potentials appearing at these same points and their time relationships when the head drum rotates at synchronous speed but lags the synchronizing pulses.

In FIGURE 1, there is shown various parts of a tape recorder including a preferred form of speed regulating circuit in accordance with the present invention. A transducer head assembly includes a head drum 10 mounted for rotation on a shaft 12. The head drum 10 is turned by a driving belt 16 driven by a synchronous motor 14. A transducer head 18 is mounted on the head drum 10 for rotation therewith. Rotation of the head drum 10 brings the transducing head 18 periodically into contact with magnetic recording tape 20, as illustrated in FIGURE 1. The transducing head records signals on the tape when the recorder is in the record mode and picks up signals from the tape when the recorder is in the playback mode. In either case, the head is coupled to signal processing circuits through conductors 21.

The tape 20 is shown disposed in what is known as an omega wrap, from its resemblance to the Greek letter capital omega. In this wrap, the tape enters the scan system from a capstan and supply reel, passes around a guide 22, travels around the head drum 10 in helical fashion and leaves the drum around a guide 24. In traveling around the drum from guide 22 to guide 24, the tape travels almost 360°. At the same time the pitch of the helix moves the tape laterally nearly one tape width in the passage of the tape around the head drum. The head drum moves in the direction opposite that of the tape and traverses paths obliquely across the tape. The advance of the tape during each rotation of the head drum produces substantially parallel recording tracks across the tape. As is apparent from the drawing, there is a gap between the guide posts 22 and 24 where there is no tape adjacent the head drum. Further, there is a small distance beyond the posts before the tape can be engaged by the head 18. Thus during each cycle of the head drum there is an interval D where the head does not contact the tape and therefore cannot record or reproduce the signals. This is the dropout interval.

It is desirable that the signal be at a particular portion of the video signal cycle during each dropout interval, preferably just prior to the vertical synchronizing interval. The speed of the head drum is therefore controlled so that the drum rotates once for each video field and the dropout portion occurs just prior to the vertical interval. As shown in the drawing, the head 18 is at the position where the vertical interval should occur.

In order to control the phase of the head drum, it is necessary to identify its phase. To this end, there is provided a phase indicator which may comprise an iron bar 26 and a magnetic pick-up 28. The iron bar is mounted on the head drum 10 in fixed relation to the head 18, and its position is therefore indicative of the position of the head 18. The position of the bar 26 is identified by the pick-up 28, which produces a signal as appears at 30 each time the iron bar 26 passes. Pulse 30 is applied through a coupling capacitor 32 to a pulse stretching circuit 34. The pulse stretching circuit 34 may comprise a monostable multivibrator and acts to produce on output conductor 35 a substantially square pulse 36 of duration $T_1$ each time the negative part of the signal 30 is applied to the pulse stretching circuit. The capacitance and resistance values of the various components, in particular, those of capacitor 38 and resistor 40, determine the width or duration $T_1$ of the square pulse 36. The term "square pulse" as used herein refers to a pulse having sharp rise and fall times and being relatively flat on top; it is not limited to pulses having equal positive and negative portions.

The square pulse 36 is applied through a coupling capacitor 41 to the base of a transistor 42, a resistor 44 being connected between this base and ground. This transistor is of the p-n-p type and is held normally conducting by the resistor 44 which permits base current to flow. A reference potential supply 46 applies a positive reference potential decreases linearly until the collector reaches the reference potential supply 46 may comprise equal resistors 48 and 50 connected in series between $B^+$ and ground with their common junction connected to the base of a transistor 52; $B^+$ is connected to the collector of the transistor 52 with a resistor 54 being connected between the emitter thereof and ground. The reference potential supply thus produces a relatively constant positive potential with a relatively low output impedance. This potential appears on a conductor 56 connected to the emitter of the transistor 52. With resistors 48 and 50 of equal resistance and a 12-volt $B^+$, 6 volts is produced on the conductor 56. A capacitor 58 with two terminals 59 and 60 is connected with terminal 59 connected to the conductor 56 and terminal 60 connected to the collector of the transistor 42. As noted earlier, the transistor 42 is normally conducting. This is because of the positive potential applied to its emitter and the resistor 44 connected between its base and ground. The terminal 60 therefore is normally at the positive reference potential on conductor 56. The transistor 42 is basically a switch controlled by the positive pulses 36 which operate to open the switch for the duration of the pulses, that is, during the intervals $T_1$.

Upon the opening the switch-transistor 42, the capacitor 58 is charged by current from a constant current supply 62. As shown, the constant current supply 62 may comprise a voltage dividing network including resistors 64 and 66 connected between $B^-$ and ground, with a capacitor 68 coupled across the resistor 66 to smooth out transients; the common junction between the resistors 64 and 66 is connected to the base of a transistor 70, the collector of which is connected to the terminal 60; a variable resistor 72 is connected between the emitter of the transistor 70 and $B^-$. Because of the well-known characteristics of transistors, the circuit 62, as shown, inherently provides constant current from its collector so long as the transistor is conducting. This current charges the capacitor 58 linearly, developing a corresponding potential on the terminal 60. The magnitude of this current and hence the rate of charge is determined by the resistance of the variable resistor 72; therefore the rate of change of potential on the terminal 60 is determined by the resistance of the resistor 72 and the capacitance of the capacitor 58. The potential decreases linearly until the collector reaches the potential of the base. The potential on the base thus serves as a negative reference potential. With the $B^-$ at $-12$ volts and resistors 64 and 66 equal, current will flow until the collector and hence terminal 60 reaches $-6$ volts.

If the time of the negative pulse of signal 30 is taken as signifying time $T_0$, the beginning of a timing cycle, the beginning of each square pulse 36 occurs at time $T_0$, and up until this time $T_0$ the potential on terminal 60 is the potential of the positive reference potential supply 56, for example, $+6$ volts. Upon the beginning of a square pulse 36, the switch-transistor 42 opens and capacitor 58 immediately begins to charge in a linear manner from the constant current supplied by constant current supply 62. The charge on the capacitor 58 drives the potential on terminal 60 negative in a linear manner until the potential thereon reaches the negative reference potential of the base of transistor 70, which may be $-6$ volts. The potential on terminal 60 is thereafter clamped at this negative reference potential until the termination of square pulse 36 at the time $T_1$ after $T_0$. After this interval $T_1$, the switch-transistor 42 is closed, whereupon the capacitor 58 is immediately discharged by the flow of current through the switch-transistor 42, and the potential on terminal 60 forthwith returns to the potential of the positive reference potential supply 46 where it remains until a succeeding square pulse 36 again opens switch-transistor 42. The cycle is then repeated, producing a potential at terminal 60 having the wave form illustrated at 74.

The wave form 74 comprises a positive reference portion 76 followed by a ramp portion 78 followed by a negative reference portion 80 followed substantially immediately by a succeeding positive reference portion 76. The potential of the positive reference portion 76 is determined by the positive reference potential supply 46 and may be, for example, +6 volts. The negative reference portion 80 is determined by the negative reference potential on the base of transistor 70 and may be, for example, −6 volts. Preferably the positive reference potential is equal and opposite to the negative reference potential, thus producing a balanced ramp 78. The slope of the ramp portion 78 is the rate of change of potential determined by the capacitance of the capacitor 58 and the magnitude of the constant current supplied by the constant current supply 62 and controlled by the magnitude of the resistor 72. As will be explained later, the slope of the ramp is made relatively steep to permit accurate phase-locking but is not made so steep as to cause instability.

The potential on the terminal 60 is applied to a buffer amplifier 82 which may be in the form of an emitter follower comprising a transistor 84 and an emitter resistor 86. This buffer amplifier provides an output on a conductor 88 in the same form as that on the terminal 60, as shown at 90. Like the signal 74, the signal 90 has positive reference portions 92, ramp portions 94, and negative reference portions 96. The signal on the conductor 88 is a reproduction of the potential on terminal 60 but is isolated therefrom in order that the signal can be sampled without disturbing the formation of the trapezoidal wave.

The waveform 90 is sampled by a sampling pulse 98 of duration $T_2$ applied to the base of a gate-transistor 100, the base being also connected to $B^+$ through a resistor 102. The signal of waveform 90 is applied over the conductor 88 to the emitter of gate-transistor 100, and the collector thereof is connected to a conductor 104 which is connected to one side of a capacitor 106 the other side of which is connected to ground. The sampling pulse opens the gate-transistor 100 to connect the signal of wave form 90 to the capacitor 106 for the duration $T_2$ of the sampling pulse.

For a detailed explanation of the operation of this circuit, the relationships between the various wave forms will be considered. For the purposes of this explanation, the occurrence of the negative part of pulse 30 may be considered as time $T_0$. It is at this point that the ramp portions 78 and 94 of wave forms 74 and 90, respectively, begin. The period of the head drum $T_D$ is the period between successive negative portions of the pulses 30, and hence the period between the beginning of successive ramps. A synchronous speed where the head 18 makes a single revolution for each video field, this period $T_D$ is 16.6 milliseconds for conventional American video signals. It has been found convenient to make the duration of the ramp potrions 78 and 94 about 4 milliseconds. In the particular recorder utilized, this provides sufficiently accurate phase-locking while at the same time avoiding instability. The period $T_1$ as produced by the pulse stretching circuit 34 is then made 10.3 milliseconds in order to balance the positive reference portions 76, 92 with the negative reference portions 80, 96 at synchronous speed.

The sampling pulses 98 may be derived in a conventional manner from the vertical synchronizing signal in the record mode and from a control track in the playback mode, synchronizing signals having been placed on the control track in synchronism with the vertical synchronizing pulses during the record mode. In the record mode, the desired condition is the recording of the vertical synchronizing interval at the time the control head is in the position it is shown to be in FIGURE 1, that is, just after the dropout interval. In the playback mode it is desired that the head be in this same position at the time of the vertical synchronizing signal.

Pulses of the wave form illustrated at 98 may be produced, for example, by overdriving an amplifier. The duration of these pulses is small relative to the period of the ramp. It may be of the order of 1 millisecond. The duration $T_2$ of the pulse 98 should be small relative to the duration $T_R$ of the ramp in order that gate-transistor 100 be opened only momentarily so that the ramp voltage can be sampled accurately. At the same time this duration $T_2$ should be large relative to the charging time constant of the capacitor 106. Otherwise, the capacitor 106 will not become fully charged to the ramp voltage within the time the sampling pulse is present. It should also be noted that the sampling pulse must be of amplitude sufficient to operate the gate-transistor 100. In this connection, it may also be noted that the required potentials of the various $B^+$ and $B^-$ supplies is a relative matter and that $B^+$ and $B^-$ must be larger than the respective reference levels to permit switching in the manner indicated. The period $T_S$ of the sampling signal appearing as pulses 98 is the period of the vertical synchronizing pulses, which occur once at the end of each field and thus once every 16.6 milliseconds according to standard American practice.

As described above, the potential appearing on conductor 88 at the time of a sampling pulse 98 is applied to capacitor 106 and stored thereon during the interval between samples. Actually, a small amount of the charge placed on the capacitor 106 is discharged through shunting resistor 108 during the intervals between sample pulses, but the time constant of the discharge circuit of capacitor 106 is made long relative to the time between sampling pulses. The shunting resistor 108 is a stabilizing resistor for the succeeding DC amplifier 110 to which the potential on capacitor 106 is applied.

The DC amplifier 110 may comprise a two-stage emitter follower serving to isolate the capacitor 106 from the succeeding part of the circuit. This two-stage emitter follower includes transistors 112 and 114 and emitter resistors 116 and 118. The signal appearing on conductor 104 is thus established at a low impedance level on a conductor 120 connected to the output of the DC amplifier 110, without loading the capacitor 106. The wave forms of the signals on conductors 104 and 120 will be of the form illustrated as wave forms 122 and 124, respectively.

The signal on conductor 120 is an error signal indicative of the amount by which the sampling pulse deviates in time from the middle of the ramp 94. With a linear ramp as illustrated, the center of the ramp is at zero volts. Any deviations in phase from the zero crossing results in the development of a potential on conductor 104 across the capacitor 106. When the head drum is late, the sampling pulse arrives relatively early and a positive potential is transferred from conductor 88 to the capacitor 106. Similarly, when the head drum is early, the sampling pulse arrives relatively late and a negative pulse is transferred from conductor 88 to the capacitor 106. Thus a positive signal on conductors 104 and 120 indicates that the head drum should be speeded up to obtain proper phase whereas a negative potential indicates that the head drum should be slowed down.

The signal on conductor 120 is applied to a filter network 126. The filter network 126 may, as shown, comprise capacitors 128 and 130 and resistors 132 and 134. The filter network 126 illustrated is of the type known as proportional plus integral plus derivative. It functions as an averaging network serving to average the sample signals developed on conductor 120 over a relatively long time. At the same time the series resistance maintains a relatively fast response time. As will be explained subsequently, this averaging network serves to permit capture of the head drum in order that it may be locked in phase with the synchronizing pulses. The output of the filter network 126 is coupled through an emitter follower circuit 135 to a conductor 136. A positive potential is thus developed on a conductor 136 when the head drum is lagging and a negative potential is developed when the head drum is leading. This error signal is utilized to control the frequency of a voltage controlled oscillator 138. The voltage controlled oscillator 138 may be a conventional astable multivibrator and may be of the form illustrated in the drawing. The output frequency of the voltage controlled oscillator 138 depends upon the relative values of the base resistors and coupling capacitors in the circuit, and particularly upon the resistance of the variable resistor 140 and the voltage applied on conductor 136. The resistor 140 is adjusted to produce a nominal frequency in absence of an error signal that will drive the head drum near the desired synchronous speed.

Upon deviations from synchronous speed and the desired phase, the filter develops a control potential on the conductor 136 which increases or decreases the frequency of the voltage controlled oscillator 138, in a manner well-known in the art, to drive the head drum 10 in synchronism with the sampling pulses 98 and in the desired phase relationship. As is evident from the circuit, an increase in potential on conductor 136 raises the bias on the base of a transistor 142, causing the transistor 142 to conduct sooner, thus decreasing the period of the multivibrator and increasing the frequency of the oscillator 138 above its nominal frequency. In the particular circuit exemplified, the nominal frequency is set at about 120 cycles per second by adjustment of the resistor 140. This produces a 120-cycle per second square wave 143 on a conductor 144 at the output of the voltage controlled oscillator 138. The positive and negative portions of this square wave are equal. Since it is desired to operate at a synchronous speed of 60 cycles per second, this signal is applied through a coupling capacitor 145 to a frequency divider network 146 which divides the frequency down to the nominal 60 cycles per second, differing therefrom according to the control signal developed on the conductor 136. This frequency divided signal, shown at 147, is applied over a conductor 148 to a power amplifier 150 used as a motor drive amplifier, the output of which is used to drive the motor 14 at the synchronous speed as determined by the frequency of the signal shown at 147, thus closing the control loop.

The operation of the circuit of FIGURE 1 to capture the head drum 10 and lock it in appropriate phase relationship to the synchronizing pulses will now be explained by reference to FIGURES 2 and 3. In FIGURE 2 there is illustrated the various wave forms obtained when the head drum is rotating too slowly in respect to the frequency of the sampling pulses 98 but with the speed control not functioning. With the head drum rotating too slowly, the period $T_D$ is too long. Without the control of the driving frequency, this period $T_D$ remains constantly too long. The pulses 30, therefore, appear regularly spaced as shown in FIGURE 2A. FIGURE 2B illustrates the corresponding pulses 36 developed by the pulse stretching circuit 34. These pulses 36 are in turn used to produce the trapezoidal wave form illustrated at FIGURE 2C. As illustrated in FIGURE 2D, because the head drum is moving too slowly, the sampling pulses 98 occur at regular intervals $T_S$ which are shorter than the periods $T_D$ of the head drum. The signal 122 illustrated in FIGURE 2E is that developed on the capacitor 106. The momentary opening of the gate-transistor 100 by a sampling pulse 98 promptly charges the capacitor 106 to the voltage appearing at the time on conductor 88. This voltage is then stored on the capacitor 106 until the next sampling pulse passes a succeeding signal to the capacitor 106. Actually, as shown, there is some decay of the voltage occasioned by shunt resistance 108, but the discharge time constant of the circuit is made so long that the voltage does not decay substantially before the expected time of arrival of a succeeding voltage to be stored. Where the synchronizing pulses are missing for any reason, the charge may leak off without departing from the invention as described. While the storage capacitor may be described as storing the signal until a succeeding signal is passed thereto, this encompasses a storage capacitor circuit wherein the stored signal is dissipated if a succeeding signal does not arrive in due course, as in the absence of synchronizing pulses.

In FIGURE 2F is illustrated the filtered and averaged error control signal developed on the conductor 136. As illustrated, this average signal is positive for a slow head drum speed. This is because the period $T_D$ is too long. With the period $T_1$ fixed at the time making the positive reference portion 92 equal to the negative reference portion 96 at the nominal speed, the positive reference portion 92 is longer than negative reference portion 96 when the period $T_D$ is too long. Because the positive reference portion is longer than the negative, sampling pulses 98 on the average come more often during a positive reference portion than during a negative reference portion; thus the potential on the capacitor 106 is more often positive than negative. Since the ramp portion is symmetrical about zero, the result is that the potential on the capacitor 106 is, on the average, more positive than negative when the head drum rotates too slowly. This results in a positive average voltage being developed on the conductor 136, as illustrated on FIGURE 2F.

Under these circumstances, when the conductor 136 is connected to the voltage controlled oscillator 138, the frequency output of oscillator 138 increases to drive the head drum at synchronous speed.

Not only does the circuit cause the drum to operate at the appropriate speed but also at the proper phase in respect to the synchronizing pulses. This may be illustrated by reference to FIGURE 3. In the example illustrated in FIGURE 3 the head drum is operating at synchronous speed; that is, the period $T_D$ of the drum is equal to the spacing $T_S$ of the sampling pulses $T_S$. FIGURE 3A illustrates the pulses 30 appearing at the output of head position detector 28. FIGURE 3B illustrates the corresponding pulses 36 produced by the pulse stretching circuit 34. The corresponding trapezoidal wave as developed on conductors 88 and 104 appears as illustrated in FIGURE 3C. The positive reference portion 92 is equal to the negative reference portion 96. The sampling pulses 98 occur with the same period $T_S$ as was shown in FIGURE 2D; however, inasmuch as the periods $T_S$ and $T_D$ are equal, the sampling pulses come at the same place in each cycle of the trapezoid pulse 90. For the sake of illustration, there is illustrated the condition where the sampling pulses come during the positive part of the ramp portion 94 as is the case when the head drum has fallen behind in phase. This results in a wave form 122 (and 124) developed on capacitor 106 (and conductor 120), as the sampling pulse samples the ramp signal at the same point in each cycle. Of course, of the head drum were still further behind in phase, the sampling pulses could have come still earlier in the cycle and produced a larger potential on the capacitor 106. Alternatively, if the head drum were ahead in phase, a negative potential would have been developed.

The filter 126 converts this signal into a substantially constant potential on conductor 136 as illustrated in FIGURE 3F. This positive signal is applied to the voltage controlled oscillator 138 to increase its frequency. This increase in frequency causes the head drum to rotate more rapidly to catch up with the sampling pulses, that is to make the sampling pulses occur at the zero crossing of the ramp portion 94 of the trapezoid wave 90. As the head drum approaches this condition, the potential developed across the capacitor 106 approaches zero and therefore the control voltage appearing on conductor 136 approaches zero. The system will then remain phase-locked, provided the system is stable.

Stability is achieved in part by making the slope of the ramp portion 94 of the trapezoidal wave sufficiently low that the voltage controlled oscillator 138 and the filter 126 do not overcontrol, that is, do not increase the speed of the motor so much as to advance the phase of the head drum farther in the forward direction than it initially lagged. The various parameters must therefore be chosen in a manner well-known in the art to provide sufficient stability to the servo system. At the same time, there must be some control potential developed on conductor 136 to control the frequency of the voltage controlled oscillator 138 if it is to operate at a frequency other than the nominal frequency. The accuracy with which phase is controlled also depends upon the slope of the ramp portion 94, a steep slope providing the most accurate control. It is therefore preferable to operate with a slope as steep as possible while achieving adequate stability.

There is thus described a circuit for indicating the error in the speed of the head drum and means for correcting this error. Further, the circuit as described provides an error voltage linearly related to the phase error of the head drum in respect to synchronizing pulses, at least the relationship being linear over the length of the ramp portion of the trapezoidal wave. This linearity as achieved by the constant current supply 62 provides a balanced system. Further, the system as described produces a zero control signal when no phase error exists, inasmuch as the sampling pulse occurs at the zero crossing point in the ramp when there is no phase error. Further, in absence of the synchronizing pulses, the charge on capacitor 106 leaks off through resistor 108, and the control signal goes to zero in absence of synchronizing pulses. In the absence of the synchronizing pulses it is preferable that the oscillator 138 operate at its nominal frequency as will be the case when a zero control signal is applied. This causes the head drum to operate at its nominal frequency ready to lock in again with the next synchronizing pulse or pulses.

Although a preferred form of the invention has been described in detail, various modifications thereof are within the scope of the invention. For example, although a linear ramp provides the most satisfactory operation and a balanced operation, ramps of other shapes are often satisfactory. Further, although the positive and negative reference levels are preferably equal, different levels are sometimes satisfactory. If the levels are different they should nevertheless provide equal integrals under the respective positive and negative portions of the trapezoidal waves when the head drum is operating at synchronous speeds, in order to permit proper operation of the averaging function of the filter 126; in other words, the average level of the trapezoidal wave should be zero when the head drum is operating in synchronism with the synchronizing pulses. Various modifications are therefore within the scope of the claims.

What is claimed is:

1. A speed regulating circuit for a tape recorder to phase-lock a rotating transducer head assembly in a predetermined time relationship to synchronizing pulses, the transducer head assembly including a transducer head mounted for rotation on a tape recorder and driven by a variable speed motor, said circuit comprising a head phase detector coupled to said transducer head assembly to produce in each cycle of rotation a head position pulse indicative of the position of the head at the time said pulse is produced, a source of first reference potential of one polarity, capacitance means having first and second terminals, said first terminal being connected to said source of first reference potential thereby placing said first terminal at said first reference potential, a switch connected between said first and second terminals, said switch being open in a first position and closed in a second position, said switch having operating means coupled ot said head phase detector and responsive to each of said head position pulses to switch said switch from one of said first and second positions to the other for a first predetermined time interval, a source of second reference potential of polarity opposite to said one polarity, current limiting means coupled between said source of second reference potential and said second terminal and effective upon opening of said switch to charge said capacitance means to drive said second terminal substantially to said second reference potential in a second predetermined time interval, storage means, a normally closed gate circuit coupled between said second terminal and said storage means and opening momentarily in response to one of said synchronizing pulses to pass to said storage means a signal indicative of the potential on said second terminal at the time of closure of said gate circuit, said storage means operating substantially to store said signal at least until the normal time of arrival of a succeeding signal thereto, and motor control means coupled to said storage means and responsive to the signal stored therein to control the speed of said motor, whereby said head drum assembly is driven in synchronism with said synchronizing pulses with said head rotating in said predetermined time relationship to said synchronizing pulses.

2. A speed regulating circuit for a tape recorded to phase-lock a rotating transducer head assembly in a predetermined time relationship to synchronizing pulses, the transducer head assembly including a transducer head mounted for rotation on a tape recorder and driven by a variable speed motor, said circuit comprising a head phase detector coupled to said transducer head assembly to produce in each cycle of rotation a head position pulse indicative of the position of the head at the time said pulse is produced, a source of first reference potential of one polarity, capacitance means having first and second terminals, said first terminal being connected to said source of first reference potential thereby placing said first terminal at said first reference potential, a switch connected between said first and second terminals, said switch being open in a first position and closed in a second position, said switch having operating means coupled to said head phase detector and responsive to each of said head position pulses to switch said switch from one of said first and second positions to the other for a first predetermined time interval, a source of second reference potential equal to said first reference potential but of polarity opposite to said one polarity, a constant current generator coupled between said source of second reference potential and said second terminal and effective upon opening of said switch to charge said capacitance means linearly to drive said second terminal substantially to said second reference potential in a second predetermined time interval, storage means, a normally closed gate circuit coupled between said second terminal and said storage means and opening momentarily in response to one of said synchronizing pulses to pass to said storage means a signal indicative of the potential on said second terminal at the time of closure of said gate circuit, said storage means operating substantially to store said signal at least until the normal time of arrival of a succeeding signal thereto, and motor control means coupled to said storage means and responsive to the signal stored therein to control the speed of said motor, whereby said head drum assembly is driven in synchronism with said synchronizing pulses with said head rotating in said predetermined time relationship to said synchronizing pulses.

3. A speed regulating circuit for a tape recorder to phase-lock a rotating transducer head assembly in a predetermined time relationship to synchronizing pulses, the transducer head assembly including a transducer head mounted for rotation on a tape recorder and driven by a variable speed motor, said circuit comprising a head phase detector coupled to said transducer head assembly to produce in each cycle of rotation a head position pulse indicative of the position of the head at the time said pulse is produced, a source of first reference potential of one polarity, capacitance means having first and second terminals, said first terminal being connected to said source of first reference potential thereby placing said first terminal at said first reference potential, a switch connected between said first and second terminals, said switch being open in a first position and closed in a second position, said switch having operating means coupled to said head phase detector and responsive to each of said head position pulses to switch said switch from one of said first and second positions to the other for a first predetermined time interval, a source of second reference potential of polarity opposite to said one polarity, current limiting means coupled between said source of second reference potential and said second terminal and effective upon opening of said switch to charge said capacitance means to drive said second terminal substantially to said second reference potential in a second predetermined time interval, storage means, a normally closed gate circuit coupled between said second terminal and said storage means and opening momentarily in response to one of said synchronizing pulses to pass to said storage means a signal indicative of the potential on said second terminal at the time of closure of said gate circuit, said storage means operating substantially to store said signal at least until the normal time of arrival of a succeeding signal thereto, and motor control means coupled to said storage means and responsive to the signal stored therein to control the speed of said motor, said head phase detector being so related to said head drum assembly as to produce a head position pulse in such phase relationship that the potential on said second terminal is zero at the time of one of said synchronizing pulses when said head is in said predetermined time relationship to said synchronizing pulses, whereby said head drum assembly is driven in synchronism with said synchronizing pulses with said head rotating in said predetermined time relationship to said synchronizing pulses.

4. A speed regulating circuit for a tape recorder to phase-lock a rotating transducer head assembly in a predetermined time relationship to synchronizing pulses, the transducer head assembly including a transducer head mounted for rotation on a tape recorder and driven by a variable speed motor, said circuit comprising a head phase detector coupled to said transducer head assembly to produce in each cycle of rotation a head position pulse indicative of the position of the head at the time said pulse is produced, a source of first reference potential of one polarity, first capacitance means having first and second terminals, said first terminal being connected to said source of first reference potential thereby placing said first terminal at said first reference potential, a switch connected between said first and and second terminals, said switch being open in a first position and closed in a second position, said switch having operating means coupled to said head phase detector and responsive to each of said head position pulses to switch said switch from one of said first and second positions to the other for a first predetermined time interval, a source of second reference potential of polarity opposite to said one polarity, current limiting means coupled between said source of second reference potential and said second terminal and effective upon opening of said switch to charge said first capacitance means to drive said second terminal substantially to said second reference potential in a second predetermined time interval, second capacitance means, a normally closed gate circuit coupled between said second terminal and said second capacitance means and opening momentarily in response to one of said synchronizing pulses to pass to said secod capacitance means a charge indicative of the potential on said second terminal at the time of closure of said gate circuit, said second capacitance means operating substantially to store said charge at least until the normal time of arrival of a succeeding charge thereto while discharging said charge in the absence of succeeding charges, and motor control means coupled to said second capacitance means and responsive to the charge stored therein to control the speed of said motor, whereby said head drum assembly is driven in synchronism with said synchronizing pulses with said head rotating in said predetermined time relationship to said synchronizing pulses.

5. A speed regulating circuit for a tape recorder to phase-lock a rotating transducer head assembly in a predetermined time relationship to synchronizing pulses, the transducer head assembly including a transducer head mounted for rotation on a tape recorder and driven by a variable speed motor, said circuit comprising a head phase detector coupled to said transducer head assembly to produce in each cycle of rotation a head position pulse indicative of the position of the head at the time said pulse is produced, a source of first reference potential of one polarity, capacitance means having first and second terminals, said first terminal being connected to said source of first reference potential thereby placing said first terminal at said first reference potential, a switch connected between said first and second terminals, said switch being open in a first position and closed in a second position, said switch having operating means coupled to said head phase detector and responsive to each of said head position pulses to switch said switch from said second position to said first position for a first predetermined time interval, a source of second reference potential of polarity opposite to said one polarity, current limiting means coupled between said source of second reference potential and said second terminal and effective upon opening of said switch to charge said capacitance means to drive said second terminal substantially to said second reference potential in a second predetermined time interval, storage means, a normally closed gate circuit coupled between said second terminal and said storage means and opening momentarily in response to one of said synchronizinsg pulses to pass to said storage means a signal indicative of the potential on said second terminal at the time of closure of said gate circuit, said storage means operating substantially to store said signal at least until the normal time of arrival of a succeeding signal thereto, averaging means coupled to said storage means for averaging the signals stored therein over a number of cycles and developing an average signal related to the average of said stored signals, and motor control means coupled to said averaging means and responsive to the average signal developed thereby to control the speed of said motor, whereby said head drum assembly is driven in synchronism with said synchronizing pulses with said head rotating in said predetermined time relationship to said synchronizing pulses.

6. A speed regulating circuit for a tape recorder to phase-lock a rotating transducer head assembly in a predetermined time relationship to synchronizing pulses, the transducer head assembly including a transducer head mounted for rotation on a tape recorder and driven by a variable speed motor, said circuit comprising a head phase detector coupled to said transducer head assembly to produce in each cycle of rotation a head position pulse indicative of the position of the head at the time said pulse is produced, a source of first reference potential of one polarity, capacitance means having first and second terminals, said first terminal being connected to said source of first reference potential thereby placing said first terminal at said first reference potential, a switch connected between said first and second terminals, said switch being open in a first position and closed in a second position, said switch having operating means coupled to said head phase detector and responsive to each of said head position pulses to switch said switch from said second position to said first position for a first predetermined time interval, a source of second reference potential of polarity opposite to said one polarity, current limiting means coupled between said source of second reference potential and said second terminal and effective upon opening of said switch to charge said capacitance means to drive said second terminal substantially to said second reference potential in a second predetermined time interval, said first and second predetermined time intervals being such that the average potential of said second terminal is zero when said head drum is driven in synchronism with said synchronizing pulses, storage means, a normally closed gate circuit coupled between said second terminal and said storage means and opening momentarily in response to one of said synchronizing pulses to pass to said storage means a signal indicative of the potential on said second terminal at the time of closure of said gate circuit, said storage means operating substantially to store said signal at least until the normal time of arrival of a succeeding signal thereto, averaging means coupled to said storage means for averaging the signals stored therein over a number of cycles and developing an average signal related to the average of said stored signals, and motor control means coupled to said average meaning and responsive to the average signal developed thereby to control the speed of said motor, whereby said head drum assembly is driven in synchronism with said synchronizing pulses with said head rotating in said predetermined time relationship to said synchronizing pulses.

7. A speed regulating circuit for a tape recorder to phase-lock a rotating transducer head assembly in a predetermined time relationship to synchronizing pulses, the transducer head assembly including a transducer head mounted for rotation on a tape recorder and driven by a variable speed motor, said circuit comprising a head phase detector coupled to said transducer head assembly to produce in each cycle of rotation a head position pulse indicative of the position of the head at the time said pulse is produced, a source of first reference potential of one polarity, capacitance means having first and second terminals, said first terminal being connected to said source of first reference potential thereby placing said first terminal at said first reference potential, a switch connected between said first and second terminals, said switch being open in a first position and closed in a second position, said switch having operating means coupled to said head phase detector and responsive to each of said head position pulses to switch said switch from said second position to said first position for a first predetermined time interval, a source of second refgerence potential of polarity opposite to said one polarity, current limiting means coupled between said source of second reference potential and said second terminal and effective upon opening of said switch to charge said capacitance means to drive said second terminal substantially to said second reference potential in a second predetermined time interval, said first and second predetermined time intervals being such that the average potential of said second terminal is zero when said head drum is driven in synchronism with said synchronizing pulses, storage means, a normally closed gate circuit coupled between said second terminal and said storage means and opening momentarily in response to one of said synchronizing pulses to pass to said storage means a signal indicative of the potential on said second terminal at the time of closure of said gate circuit, said storage means operating substantially to store said signal at least until the normal time of arrival of a succeeding signal thereto, averaging means coupled to said storage means for averaging the signals stored therein over a number of cycles and developing an average signal related to the average of said stored signals, and motor control means coupled to said averaging means and responsive to the average signal developed thereby to control the speed of said motor, said head phase detector being so related to said head drum assembly as to produce a head position pulse in such phase relationship that the potential on said second terminal is zero at the time of one of said synchronizing pulses when said head is in said predetermined time relationship to said synchronizing pulses, whereby said head drum assembly is driven in synchronism with said synchronizing pulses with said head rotating in said predetermined time relationship to said synchronizing pulses.

8. A speed regulating circuit for a tape recorder to phase-lock a rotating transducer head assembly in a predetermined time relattionship to synchronizing pulses, the transducer head assembly including a transducer head mounted for rotation on a tape recorder, and driven by an electric motor operating at a speed determined by the frequency of the driving voltage applied thereto, said circuit comprising a head phase detector coupled to said transducer head assembly to produce in each cycle of rotation a head position pulse indicative of the position of the head at the time said pulse is produced, a source of first reference potential of one polarity, capacitance means having first and second terminals, said first terminal being connected to said source of first reference potential thereby placing said first terminal at said first reference potential, a switch connected between said first and second terminals, said switch being open in a first position and closed in a second position, said switch having operating means coupled to said head phase detector and responsive to each of said head position pulses to switch said switch from one of said first and second positions to the other for a first predetermined time interval, a source of second reference potential of polarity opposite to said one polarity, current limiting means coupled between said source of second reference potential and said second terminal and effective upon opening of said switch to charge said capacitance means to drive said second terminal substantially to said second reference potential in a second predetermined time interval, storage means, a normally closed gate circuit coupled between said second terminal and said storage means and opening momentarily in response to one of said synchronizing pulses to pass to said storage means a signal indicative of the potential on said second terminal at the time of closure of said gate circuit, said storage means operating substantially to store said signal at least until the normal time of arrival of a succeeding signal thereto, a frequency generator coupled to said storage means and responsive to the signal stored therein to generate a frequency signal at a frequency dependent upon said stored potential, and means for coupling said frequency signal to said electric motor to apply said frequency signal to said motor as a motor driving voltage, whereby said head drum assembly is driven in synchronism with said synchronizing pulses with said head rotating in said predetermined time relationship to said synchronizing pulses.

9. A speed regulating circuit for a tape recorder to phase-lock a rotating transducer head assembly in a predetermined time relationship to synchronizing pulses, the transducer head assembly including a transducer head mounted for rotation on a tape recorder, and driven by an electric motor operating at a speed determined by the frequency of the driving voltage applied thereto, said circuit comprising a head phase detector coupled to said transducer head assembly to produce in each cycle of rotation a head position pulse indicative of the position of the head at the time said pulse is produced, a source of first reference potential of one polarity, capacitance means having first and second terminals, said first terminal being connected to said source of first reference potential thereby placing said first terminal at said first reference potential, a normally open two position switch connected between said first and second terminal, said switch being open in a first position and closed in a second position, said switch having operating means coupled to said head phase detector and responsive to each of said head position pulses to switch said switch from said second position to said first position for a first predetermined time interval, a source of second reference potential equal to said first reference potential but of polarity opposite to said one polarity, a constant current generator coupled between said source of second reference potential and said second terminal and effective upon opening of said switch to charge said capacitance means linearly to drive said second terminal substantially to said second reference potential in a second predetermined time interval, storage means, a normally closed gate circuit coupled between said second terminal and said storage means and opening momentarily in response to one of said synchronizing pulses to pass to said storage means a signal indicative of the potential on said second terminal at the time of closure of said gate circuit, said storage means operating substantially to store said signal at least until the time of arrival of a succeeding signal thereto, averaging means coupled to said storage means for averaging the signals stored therein over a number of cycles and developing an average signal related to the average of said stored signals, a frequency generator coupled to said averaging means and responsive to the average signal developed thereby to generate a frequency signal at a frequency dependent upon said average signal, and means for coupling said frequency signal to said electric motor to apply said frequency signal to said motor as a motor driving voltage, whereby said head drum assembly is driven in synchronism with said synchronizing pulses with said head rotating in said predetermined time relationship to said synchronizing pulses.

10. A speed regulating circuit for a tape recorder to phase-lock a rotating transducer head assembly in a predetermined time relationship to synchronizing pulses, the transducer head assembly including a transducer head mounted for rotation on a tape recorder and driven by an electric motor operating at a speed determined by the frequency of the driving voltage applied thereto, said circuit comprising a head phase detector coupled to said transducer head assembly to produce in each cycle of rotation a head position pulse indicative of the position of the head at the time said pulse is produced, the duration of said head position pulse being a first predetermined time interval, a source of first reference potential of one polarity, capacitance means having first and second terminals, said first terminal being connected to said source of first reference potential thereby placing said first terminal at said first reference potential, a normally open switch connected between said first and second terminals, said switch being open in a first position and closed in a second position, said switch having operating means coupled to said head phase detector and responsive to each of said head position pulses to switch said switch from said second position to said first position for said first predetermined time interval, a source of second reference potential equal to said first reference potential but of polarity opposite to said one polarity, a constant current generator coupled between said source of second reference potential and said second terminal and effective upon opening of said switch to charge said capacitance means linearly to drive said second terminal substantially to said second reference potential in a second predetermined time interval, storage means, a normally closed gate circuit coupled between said second terminal and said storage means and opening momentarily in response to one of said synchronizing pulses to pass to said storage means a signal indicative of the potential on said second terminal at the time of closure of said gate circuit, said storage means operating substantially to store said signal at least until the normal time of arrival of a succeeding signal thereto, averaging means coupled to said storage means for averaging the signal stored therein over a number of cycles and developing an average signal related to the average of said stored signals, a frequency generator coupled to said averaging means and responsive to the average signal developed thereby to generate a frequency signal at a frequency dependent upon said average signal, and means for coupling said frequency signal to said electric motor to apply said frequency signal to said motor as a motor driving voltage, whereby said head drum assembly is driven in synchronism with said synchronizing pulses with said head rotating in said predetermined time relationship to said synchronizing pulses, said head phase detector being so related to said head drum assembly as to produce a head position pulse in such phase relationship that the potential on said second terminal is zero at the time of one of said synchronizing pulses when said head is in said predetermined time relationship to said synchronizing pulses.

11. A speed regulating circuit for a tape recorder to phase-lock a rotating transducer head assembly in a predetermined time relationship to synchronizing pulses, the transducer head assembly including a transducer head mounted for rotation on a tape recorder and driven by an electric motor operating at a speed determined by the frequency of the driving voltage applied thereto, said circuit comprising a head phase detector coupled to said transducer head assembly to produce in each cycle of rotation ahead position pulse indicative of the position of the head at the time said pulse is produced, the duration of said head position pulse being a first predetermined interval, a source of first reference potential of one polarity, first capacitance means having first and second terminals, said first terminal being connected to said source of first reference potential thereby placing said first terminal at said first reference potential, a normally open switch connected between said first and second terminals, said switch being open in a first position and closed in a second position, said switch having operating means coupled to said head phase detector and responsive to each of said head position pulses to switch said switch from said second position to said first position for said first predetermined time interval, a source of second reference potential equal to said first reference potential but of polarity opposite to said one polarity, a constant current generator coupled between said source of second reference potential and said second terminal and effective upon opening of said switch to charge said first capacitance means linearly to drive said second terminal substantially to said second reference potential in a second predetermined time interval, said first and second predetermined time intervals being such that the average potential of said second terminal is zero when said head drum is driven in synchronism with said synchronizing pulses, second capacitance means, a normally closed gate circuit coupled between said second terminal and said second capacitance means and opening momentarily in response to one of said synchronizing pulses to pass to said second capacitance means a charge indicative of the potential on said second terminal at the time of closure of said gate circuit, second capacitance means operating substantially to store said charge at least until the normal time of arrival of a succeeding charge thereto while discharging said charge in the absence of succeeding charges, averaging means coupled to said second capacitance means for averaging the charge stored therein over a number of cycles and developing an average signal related to the average of said stored charges, a frequency generator coupled to said averaging means and responsive to the average signal developed thereby to generate a frequency signal at a frequency dependent upon said average signal, and means for coupling said frequency signal to said electric motor to apply said frequency signal to said motor as a motor driving voltage, said head phase detector being so related to said head drum assembly as to produce a head position pulse in such phase relationship that the potential on said second terminal is zero at the time of one of said synchronizing pulses when said head is in said predetermined time relationship to said synchronizing pulses, whereby said head drum assembly is driven in synchronism with said synchronizing pulses with said head rotating in said predetermined time relationship to said synchronizing pulses.

No references cited.

ORIS L. RADER, *Primary Examiner.*
J. J. BAKER, *Assistant Examiner.*